Dec. 31, 1946.  C. M. JONES  2,413,633
ARTIFICIAL LANDSCAPE
Filed May 3, 1945  3 Sheets-Sheet 1

INVENTOR.
Clifton M. Jones
BY Albert M. Austin
his ATTORNEY.

Dec. 31, 1946.                    C. M. JONES                    2,413,633
                              ARTIFICIAL LANDSCAPE
                              Filed May 3, 1945                3 Sheets-Sheet 2
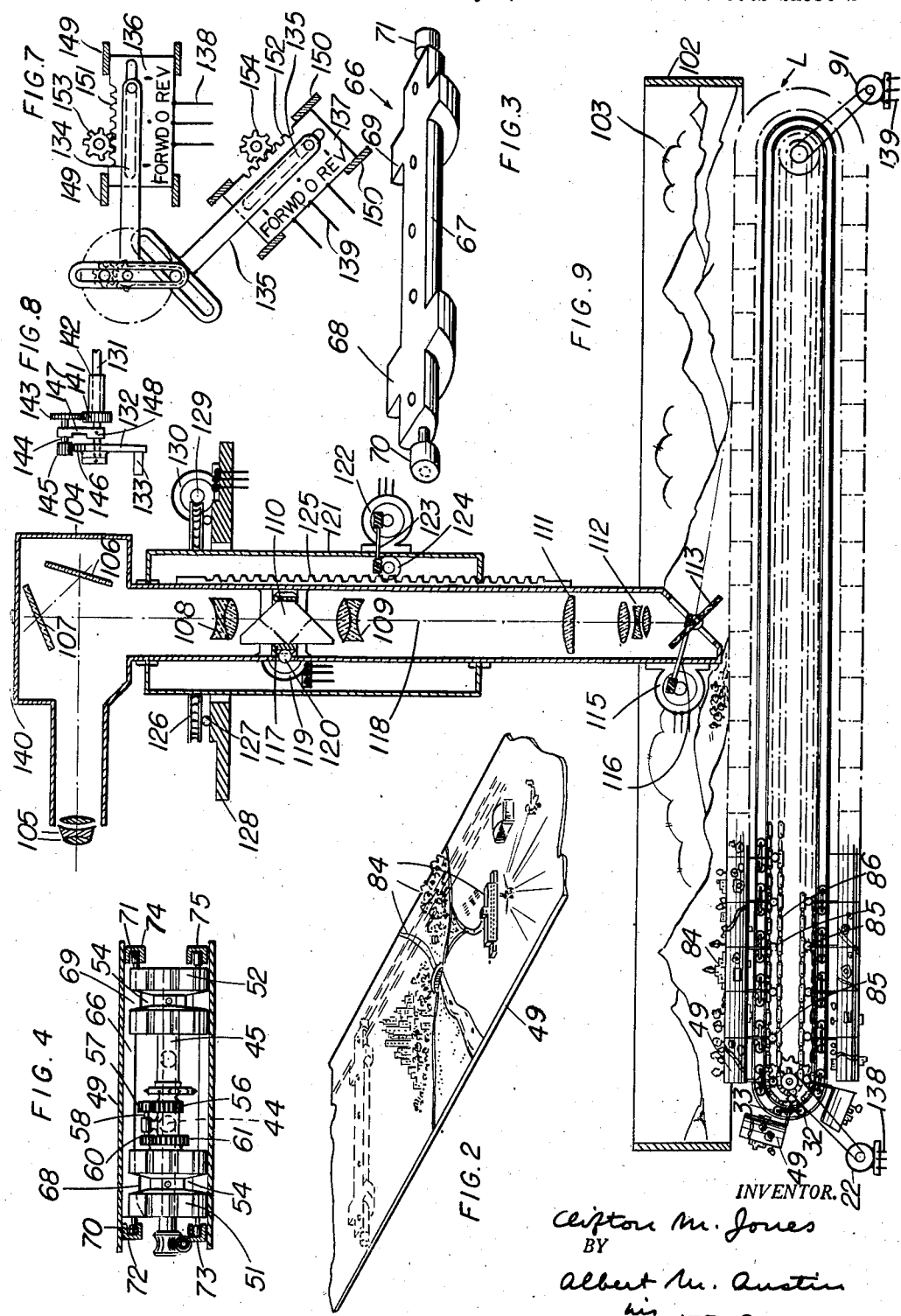
INVENTOR.
Clifton M. Jones
BY
Albert M. Austin
his ATTORNEY.

Dec. 31, 1946.  C. M. JONES  2,413,633
ARTIFICIAL LANDSCAPE
Filed May 3, 1945   3 Sheets-Sheet 3
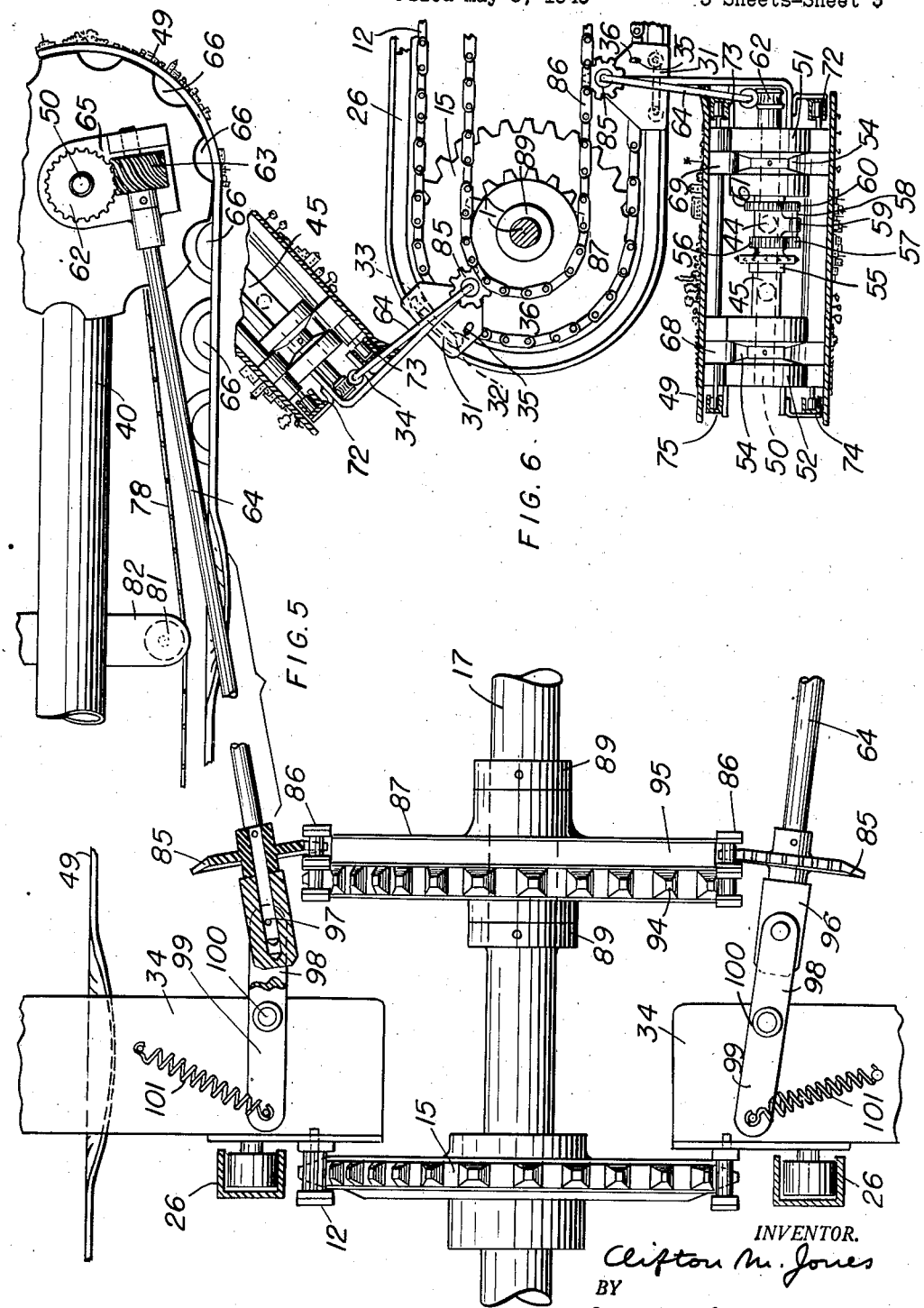
INVENTOR.
Clifton M. Jones
BY
Albert M. Austin
his ATTORNEY.

Patented Dec. 31, 1946

2,413,633

UNITED STATES PATENT OFFICE 2,413,633

ARTIFICIAL LANDSCAPE

Clifton M. Jones, New York, N. Y.

Application May 3, 1945, Serial No. 591,825

14 Claims. (Cl. 35—10)

This invention provides a composite surface continuously movable in any desired direction and has particular application to artificial landscapes used for creating the illusion of travel of an observer who, in fact, does not move while the landscape moves relatively to him.

According to the invention, the composite movable surface is formed by a plurality of parallel endless belts carried by an endless conveyor. The conveyor travels in a direction which for convenience of explanation may be called longitudinal direction. The individual belts are movable in a direction at right angles, or transverse, with respect to the direction of advance of the conveyor and are arranged edge to edge to present a continuous unbroken surface. Any point of this composite surface may be moved in any desired direction and at any desired rate of speed, in fact may be moved to follow any desired curve by appropriate control of the movement of the conveyor and of the individual belts.

In the application of this invention to artificial landscapes, the individual transversely extending belts are driven in synchronism so as to move as a unit and carry landscape elements such as buildings, trees, roads, bridges, etc. An observer viewing the landscape from a fixed point directly or through an optical viewing device has the impression of travelling with respect to the landscape when the landscape is moved with respect to him by an appropriate actuation of the conveyor and of the individual belts. Thus the invention has particular application to synthetic training devices, such as devices for training airplane pilots since the visual impression of a flight over the earth's surface may be produced very realistically. Depth perception is retained at all times since the artificial landscape is in fact a three dimensional movable structure. This feature makes the invention particularly valuable for such phases of pilot training where a correct judgment of depth and distance is important. In this respect the present invention differs materially from devices for creating an illusion of travel by projected films which have no depth.

Due to its peculiar construction and operability, an artificial landscape according to this invention lends itself admirably to the reproduction of all flight conditions, such as changes of course, climbing, diving, banking, take-off and landing, particularly where these maneuvers have to be executed under cross-wind conditions.

Changes of course may be reproduced since it is possible to move the landscape continuously in any desired direction. Assuming, for example, that an observer views the landscape in a direction of travel of the conveyor, the landscape will move towards the observer when the conveyor is driven while the individual belts are maintained stationary. If an observer looks in the direction of the individual belts, the landscape will move towards him when the individual belts are driven while the conveyor remains stationary. Travel in a direction of 45 degrees with respect to the conveyor and the belts may be simulated by driving both the conveyor and the individual belts whereby again the landscape will move towards the observer. It will move straight toward the observer when the rate of advance of the belts is equal to that of the conveyor. Drifting due to lateral wind may be simulated by increasing the rate of the conveyor or of the belt as the case may be.

Banking may be reproduced by tilting the observer relatively to the landscape or by tilting the landscape relatively to the observer. In a preferred form of the invention this tilting is done optically by a prism or any other reflecting elements causing tilting of the image in the eyes of the observer.

Diving and climbing may be reproduced similarly by tilting the observer or the landscape but is preferably accomplished optically simply by tilting a reflecting surface, for example a mirror.

Changes in altitude may be simulated by increasing or decreasing the distance between the observer and the artificial landscape. It may also be done purely optically by continuous change of the ratio of magnification of the viewing device.

The various objects, features and advantages of this invention will appear more fully from the detailed description which follows accompanied by drawings showing for the purpose of illustration an application of the invention to artificial landscapes for synthetic training devices for airplane pilots.

The invention also consists in certain new and original features of construction and combinations of parts hereinafter set forth and claimed.

Although the characteristic features of the invention which are believed to be novel will be particularly pointed out in the claims appended hereto, the invention itself, its objects and advantages and the manner in which it may be carried out may be better understood by referring to the following description taken in connection with the accompanying drawings forming a part thereof in which Fig. 1 is a perspective view of an artificial landscape made up of individual belts arranged transversely on an endless conveyor;

Fig. 2 shows on an enlarged scale a portion of a transverse belt with landscape elements thereon;

Fig. 3 is a perspective view of a cleat for reinforcing, guiding and driving the transverse belts;

Fig. 4 is an end view, partly in section, of a gear mechanism for driving the transverse belts, a section being taken on lines 4—4 of Fig. 1;

Fig. 5 is a side view, partly in section, showing a conveyor chain and an independent drive chain for driving the transverse belts, the view being taken on line 5—5 of Fig. 1;

Fig. 6 is a detailed side view, partly out of scale, illustrating the fanning out of the individual belts at the ends of the conveyor;

Fig. 7 is a plan view of the control mechanism, shown partly diagramatically, for joint control of the conveyor and of the individual belts;

Figure 1:
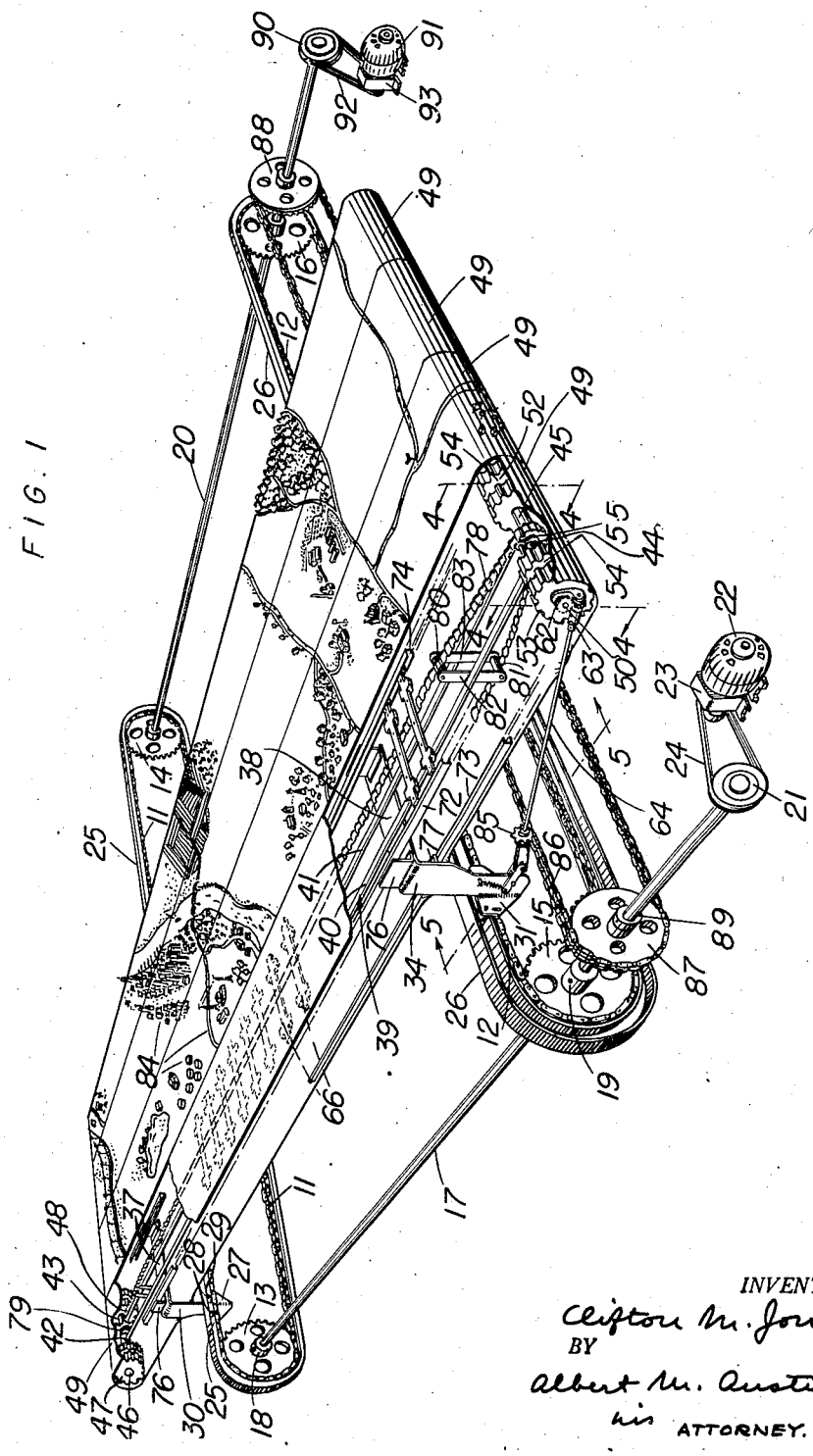

Fig. 8 is a side view of elements of the mechanism of Fig. 7 for introducing a predetermined phase shift to produce an impression of drifting due to side wind or skid; and Fig. 9 is a side view of the artificial landscape, a horizon member and an optical viewing device, the optical viewing device being shown on a greatly enlarged scale with respect to the other parts of the figure for the purpose of illustration.

In the following description and in the claims various details will be identified by specific names for convenience. The names however, are intended to be as generic in their application as the art will permit.

Like reference characters refer to like parts in the several figures of the drawings. In the drawings accompanying, and forming part of, the specification, certain specific disclosure of the invention is made for the purpose of explanation of broader aspects of the invention, but it is understood that the details may be modified in various respects without departure from the broad aspects of the invention.

A preferred form of construction of the continuously movable composite surface according to this invention and its manner of operation may be conveniently explained by referring to Fig. 1 which shows perspectively the principal structure of the device, parts not essential for understanding of the device being omitted.

A pair of endless conveyor chains 11 and 12 are trained over chain gears 13, 14 and 15, 16 respectively. The gears 13 and 15 are fixed on a drive shaft 17 as is indicated by pins 18 and 19. The gears 14 and 16 turn freely on a second shaft 20 which is mounted parallel with respect to the shaft 17. The conveyor drive shaft 17 carries a pulley 21 and is driven by a motor 22 over a speed reduction gear 23 and a belt 24. Tracks 25 and 26 of substantially U-shaped cross section open towards the ends of the shaft, are mounted parallel to the conveyor chains 11 and 12. A carriage 27 having rollers 28 and 29 engages the track 25 and supports an L-shaped bracket 30 for the support of individual transverse belts later to be described. A similar carriage 31 engages the track 26 with rollers 32 and 33 and carries an L-shaped bracket 34.

The carriages 31 are also shown in Fig. 6, on an enlarged scale. Certain cross pins 35 of the conveyor 12 and similar cross pins in the opposite conveyor chain 11 are extended and project through elongated apertures 36 in the carriage 31 to move the carriages along with the respective conveyor chain.

The conveyor chains 11 and 12 are of equal length and the gears 13, 14, 15 and 16 over which the conveyor chains run are of equal diameter to insure movement of pairs of brackets, such as brackets 30 and 34, at exactly the same rate and in alignment with each other.

The L-shaped brackets 30 and 34 comprise horizontal portions 37 and 38 to which a belt supporting framework 39 is secured in appropriate manner by welding, screwing or otherwise. Each framework 39 consists of two longitudinal members 40 and 41, preferably tubing, secured with their ends to bearing members 42, 43, and 44, 45 a pair of bearing members being arranged at each end.

A shaft 46 extends through the bearing members 42 and 43 at one end of the frame and carries a pair of pulleys 47 and 48 over which an endless belt 49 of rubberized fabric or other strong flexible material runs. A similar shaft 50 extends through the bearing members 44 and 45 and carries pulleys 51 and 52. Each pulley has peripheral transverse grooves or indentations 53 and a portion of reduced diameter 54 for purposes which will later become apparent.

A chain gear 55 turns freely on the center portion of the shaft 50 intermediate the bearings 44 and 45. The chain gear 55 is integrally connected with a spur gear 56 meshing with a pinion 57. The pinion 57 is fast on a shaft 58 carried in an extension 59 of the bearing member 44. A second pinion 60 on the shaft 58 meshes with a gear 61 integral with or secured to the belt pulley 51. The ratio of transmission of the gear train 56, 57, 60 and 61 so selected that the peripheral speed of the chain gear at the pitch diameter is equal to the peripheral speed of the belt pulley 51. A helical gear 62 is secured to the end of the shaft 50 to which also the belt pulleys 51 and 52 are secured. A further helical gear 63 on a relatively thin drive shaft 64 is supported in a bearing member 65 pivotally mounted on the shaft 50.

Reinforcing cleats 66 preferably of light weight metal or plastic material are secured to the underside of the belt 49 in a suitable manner, such as by cementing, rivets or staples. The cleats are shown in greater detail in Fig. 3. They comprise a transversely extending rib 67 generally of semi-circular cross section fitting into the peripheral grooves 53 of the belt pulleys. Flanges 68 and 69 on the cleats engage the portions 54 of reduced diameter in the belt pulleys and insure accurate alignment of adjoining belts. Rollers 70 and 71 are mounted on either end of the cleats for engaging upper and lower guide rails 72, 73, 74 and 75 to insure accurate parallel running of the belts and to prevent sagging. The guide rails are secured to posts 76 and 77, the brackets in turn being secured to the L-shaped brackets 34.

A drive chain 78 is provided for engaging and driving the belt at portions intermediate the belt pulleys, thereby eliminating stretching of the belt which may be of considerable length and may span a distance of about 20 feet. The chain 78 is trained around the chain gear 55 and idler chain gear 79 at the other end of the framework. Pairs of spacer rollers 80 and 81 mounted on brackets 82 and 83 within the framework spread the upper and lower run of the drive chain 78 into engagement with the underside of the cleats 66 thereby carrying the cleats along by a frictional engagement. The linear rate of movement of the drive chain 78 is equal to that of the belt 49 which it assists in moving. The gear train for the driving chain gear 55 is therefore so dimensioned as to drive the chain gear 55 at a rate at which its peripheral speed at the pitch diameter equals that of the belt 49.

Landscape elements 84 such as buildings, trees, forests, rivers, roads and bridges are mounted on the belt surface. The landscape elements are three-dimensional and are preferably made of material which will stand slight distortion when the belt 49 passes over the end pulleys. Sponge rubber, either natural or synthetic, is a suitable material for the landscape elements. It may be coated on the outside with a solid thin sheet of rubber or latex so that the porous structure of the material is not apparent.

The belts 49 carrying the landscape elements are driven synchronously to maintain proper alignment between the several belts at all times. This is necessary since otherwise landscape elements such as roads and rivers extending across several belts would become disaligned.

While an individual drive for each belt is entirely feasible, for example by means of a synchronous motor associated with each belt, I prefer to employ a mechanical drive means common to all the belts. In the illustrated example, each belt has a drive shaft 64 extending from the helical gear 62 and 63. The drive shaft 64 carries a chain pinion 85 near its free end which meshes with a drive chain 86.

The drive chain 86 is preferably a double chain as is clearly shown in Fig. 5 and consists in effect of two interconnected chains running side by side and trained around chain gears 87 and 88. The gear 87 turns freely on the conveyor drive shaft 17 and is held in place by collars 89. The chain gear 88 is secured to the drive shaft 20 carrying a pulley 90 at its end connected to an electric motor 91 by a belt 92 and a reduction gear 93. The pitch diameter of the chain gears 87 and 88 equals that of the chain gears 15 and 16 although it should be noted that the gear 87 is shown smaller and out of scale in Figs. 6 and 9 for illustration purposes in order not to obscure the conveyor chain 12 and the carriages 31 driven thereby. The correct dimensions of the gears are clearly shown in Fig. 5.

The chain gears 87 and 88 have two peripheral portions 94 and 95. Peripheral portion 94 is provided with teeth to drive and guide the double drive chain passing thereover. The peripheral portion 95 is smooth and accommodates that portion of the double drive chain which meshes with the chain pinions 85 on the ends of the drive shafts 64.

The free ends of the drive shafts 64 are floatingly mounted in bushings 96, each bushing being pivotally held between pivots 97 of the forked end 98 of the double armed lever 99 pivoted at 100. The free end of the double armed lever is connected to a contraction spring 101 which tends to turn the double armed lever 99 about its pivot 100 so as to urge the chain pinions 85 into engagement with the chain 86 at all times.

The operation of this device so far described is as follows: The belts 49 present a continuous unbroken plane surface. Due to the accurate alignment and guidance of the belts, the edges of adjacent belts are practically invisible and are far less pronounced than shown in the drawings. The edges of the belts extend somewhat beyond the ends of the cleats 66 and are sufficiently yieldable to flex out of the way where the edges of the belts pass the L-shaped brackets 30 and 34 and the shaft 64.

When the conveyor 11, 12 is driven by the conveyor motor 22, and the chain 86 is driven to move at the same rate as the conveyor, the entire landscape will move continuously towards or away from the conveyor drive shaft 17 and an observer will have the impression of travelling over the landscape in a direction at right angles with respect to the edges of the belts 49.

At the ends of the conveyor near the drive shaft 17 and 20, the individual belts separate and fan out, as is shown in Figs. 6 and 9. This point, however, is outside the field of vision. It is quite apparent that due to the unique arrangement of the belts on the conveyor, the movement of the landscape with respect to an observer may be continued indefinitely although, of course, after a certain time the scenery will repeat itself when the conveyor has completed one full revolution.

When the conveyor motor 22 is at rest and the belt motor 91 is driven, the landscape will move in a direction at right angles to the movement previously described and the scenery will either move towards or away from the drive shaft 50 for the belt pulleys 51 and 52. This movement of the landscape likewise may be continued indefinitely although, of course, after a certain time, the scenery will also repeat itself.

If both the conveyor 11, 12 and the chain 86 are driven at differential speeds, the landscape will move obliquely. Assuming for example that the linear speed of the belts is equal to the linear speed of the conveyors, the landscape will move in a direction 45 degrees with respect to the edges of the belts and will, for example, move straight towards the observer of Fig. 1. Changes in the rate of the motors 22 and 91 driving the conveyor 11, 12 and the chain 86 respectively result in corresponding changes in the direction of advance of the landscape, thus permitting reproduction of drift conditions, particularly drifting as a result of side wind or skid.

An artificial landscape together with an optical viewing device is shown in Fig. 9. In considering this figure, it should be borne in mind that the optical viewing device is shown on a greatly enlarged scale to show its construction while the landscape is shown greatly reduced.

The artificial landscape generally designated as L is surrounded by a horizon member or ring 102 bearing on its inside surface landscape elements 103 which may be photographically reproduced and which provide a suitable horizon blending with the landscape.

An optical viewing device V is mounted approximately above the center of the artificial landscape. It is a binocular system although in the drawings only the optical system for one eye is shown, it being understood that the optical system for the other eye is identical with that shown. The optical elements of the viewing device are mounted within a tubular casing 104 and comprise an eye piece 105, two reflecting surfaces 106 and 107, preferably front surface plated mirrors, sets of lenses 108 and 109 for producing a path of parallel light therebetween, a prism 110 between the lens systems 108 and 109, a further lens 111 and an objective lens combination 112. A further reflecting surface preferably a mirror 113 is placed in front of the objective lens system for deflecting the axis of vision onto the landscape.

The mirror 113 is pivoted about a horizontal axis 114 and is adjustable by means of a climb and dive motor 115 through a suitable gear and shaft connection 116.

The prism 110 is mounted in a ring 117 adjustable about a vertical axis 118. The ring 117 may be rotated by a banking motor 119 through a suitable gear and shaft connection 120.

The tubular casing 104 is vertically adjustable in an outer tube 121 in which it slides, so as to increase the distance between the landscape and an observer. An altitude motor 122 through a suitable gear and shaft connection 123 drives a pinion 124 meshing with a rack 125 on the inner tubular casing 104.

The outer tube 121 in turn is adjustable in azimuth and is provided with a flange 126 resting in ball bearings 127 on a fixed support 128. The flange 126 may be formed as a worm gear meshing with a worm 129 on the shaft of an azimuth motor 130.

The optical system operates as follows: Through the eye pieces 105 of the binocular system, the observer has a binocular view of the artificial landscape below him. Flight conditions are easily reproduced by an appropriate adjustment of the various adjustable optical elements whereby all flight conditions may be reproduced. An adjustment of the mirror 113 about the horizontal axis 114 results in a reproduction of conditions of climbing and diving. Banking of the plane is reproduced by adjusting the prism 110 about the vertical axis 118 resulting in tilting of the landscape in the eyes of an observer with respect to him. Changes in altitude are reproduced by changing the distance between the landscape and the observer by elevating the inner tubular casing 104 within the outer tube 121. It is understood, however, that the same effect may be produced without change in actual distance by an optical system for continuously changing the ratio of magnification. Such systems are well known in the optical art and may be incorporated in this device in place of the means for vertical adjustment of the inner tubular casing 104 within the outer tube 121.

Changes in course are reproduced by turning the entire optical system in azimuth. Obviously the same effect can be produced by turning the entire landscape in azimuth with respect to the optical system.

The several motors 115, 119, 122 and 130 for adjusting the various optical elements and the motors 22 and 91 controlling the direction of advance and the rate of advance of an artificial landscape may be controlled remotely by the flight controls of a mock-up in which the student pilot sits and further by controls of the instructor.

Preferably the direction and the rate of advance of the landscape with respect to the viewing device is automatically controlled so as to cause the landscape to move generally in the direction in which the observer looks. The direction of view is determined by the azimuth adjustment of the optical viewing device V. Assuming absence of lateral wind, the landscape will move directly towards the observer. Under side wind conditions, however, there will be lateral drifting, which may be reproduced by introducing a phase angle between the azimuth adjustment of the viewing device and the direction of advance of the landscape or by appropriate control of the speed of the two motors operating the landscape.

Automatic control means for controlling the direction of advance of the landscape with respect to the viewing device are schematically illustrated in Figs. 7 and 8.

An azimuth shaft 131 operates over a suitable phase gearing hereinafter explained, a crank 132. The crank 132 has a pin 133 engaging two control arms 134 and 135 of motor control apparatus 136 and 137. The control apparatus 136 is connected to a source of power and further to the conveyor motor 22 through lines 138. The motor control apparatus 137 is connected to a source of electric power and to the belt motor 91 through lines 139. Preferably the voltage of the source of power for the belt motor 91 is higher than the voltage of the source for the conveyor motor 22, the ratio of voltages being preferably square root of two, to one.

The control apparatus 136 and 137 may assume the form of motor rheostats which are preferably individually adjustable. The control apparatus is mounted in guides 149 and 150 and is equipped with racks 151 and 152 meshing with pinions 153 and 154, respectively, permitting individual speed adjustment of the motors in addition to the joint actuation of the azimuth shaft 131. In the position shown in Fig. 7, both motors 22 and 91 are running in reverse motor 22 at a reduced speed and motor 91 at high speed causing the landscape to advance obliquely with respect to the edges of the belts 49.

The azimuth shaft 131 may be directly connected to the optical viewing device, for example by direct attachment at 140. In order to introduce a phase shift to reproduce lateral drift, a change in the phase relation between the crank 132 and the azimuth shaft 131 may be produced by a gear train comprising a gear 141 on a hollow shaft 142 surrounding the azimuth shaft 131. The gear 141 meshes with a pinion 143 on a shaft 144 carrying a second pinion 145. The pinion 145 meshes with a gear segment 146 on the crank 132 which is free to rotate on the azimuth shaft 131. An arm 147 is fixedly secured to the azimuth shaft at 148 and carries on its free end a bearing for the pinion shaft 144.

An adjustment of the hollow shaft 142 about the azimuth shaft 131 causes an angular adjustment of the control crank 132 with respect to the azimuth shaft, thereby introducing the desired change in the phase relation.

While the composite movable surface according to my invention has particular features and advantages if used as an artificial landscape, its uses are not limited thereto, and it is therefore not necessary that all the belts be synchronously driven at all times, even though such synchronous drive offers particular advantages in artificial landscapes.

In its particular application to an artificial landscape, the illustrated form and construction of the device is very desirable. However, it should be understood that many structural details may be changed and modified depending on the specific requirements of each case. It is therefore not indispensable that the artificial landscape be horizontaly arranged. It may also be vertically arranged or be placed overhead. While in the illustrated embodiment the surface of the artificial landscape is substantially square with an optical viewing device in the center of the square, the arrangement may be changed. The artificial landscape may be substantially rectangular in outline and the device for viewing the landscape may be placed at other points. The viewing device likewise may take different forms. It may be equipped with an automatic focusing device in a manner known in the optical art. The optical viewing device may also be dispensed with and the landscape be viewed directly.

All such changes, modifications, additions, omissions and substitutions will readily occur to persons skilled in the art once the general substance of this invention is understood. Such changes therefore do not involve a departure from the spirit and teaching of this invention.

What is claimed is:

1. A device of the character described providing a surface continuously movable in any desired direction, the device comprising, in combination, an endless conveyor; a plurality of belts carried by said conveyor, said belts being movable in a direction at right angles with respect to the direction of movement of said conveyor; means for driving said conveyor; and means for driving said belts.

2. A device of the character described providing a surface continuously movable in any desired direction, the device comprising, in combination, an endless conveyor; a plurality of belts; means for supporting said belts on said conveyor in edge to edge relationship to form a substantially continuous surface, and with freedom to move at right angles with respect to said conveyor; means for driving said conveyor; and means for driving said belts in synchronism with one another.

3. A device of the character described providing a surface continuously movable in any desired direction, the device comprising, in combination, an endless conveyor; a plurality of belts; means for supporting said belts on said conveyor in edge to edge relationship to form a substantially continuous surface, and with freedom to move at right angles with respect to said conveyor; means for driving said conveyor; means for driving said belts in synchronism with one another; and joint control means for controlling the rate and direction of both said driving means.

4. A device of the character described providing a surface continuously movable in any desired direction, the device comprising, in combination, an endless oblong track including straight track sections and curved track sections; an endless chain parallel to said track; a plurality of endless belts; a carriage for each of said belts supporting said belt on said track at right angles with respect to said track, the carriages being connected to said chain to be driven thereby along said track, the carriages being so spaced as to support said belts in edge to edge relationship along the straight track sections while permitting fan-like separation between the belts along the curved track sections; means for driving said chain; and means for driving said belts at right angles with respect to said chain, the belts along the straight track sections forming a substantially continuous surface movable in any desired direction in dependence on the rate of advance of said chain along said track and the motion of said belts at right angles with respect to said track.

5. A device of the character described providing a surface continuously movable in any desired direction, the device comprising, in combination, a pair of spaced parallel endless oblong tracks, each track including straight track sections and curved track sections; two endless chains, one adjacent to each track; a common drive means for said chains; a plurality of endless belts; a pair of carriages for each belt, each carriage being associated with one of said tracks and chains, said carriages supporting said belt on said tracks at right angles with respect to said track, the carriages being connected to their associated chains to be advanced thereby along said tracks, pairs of carriages being so spaced as to support said belts in edge to edge relationship along said straight track sections while permitting fan-like separation between the belts along the curved track sections; means for driving said belts in a direction at right angles with respect to said chain, the belts along the straight track sections forming a substantially continuous surface movable in any desired direction in dependence on the rate of advance of said carriages along said tracks and the motion of said belts at right angles with respect to the direction of the carriages.

6. An artificial movable landscape comprising, in combination, a plurality of endless belts; landscape elements on said belts; an endless conveyor; means for supporting said belts on said conveyor in edge to edge relationship to form a substantially continuous surface, and for movement at right angles with respect to the direction of movement of the conveyor; means operatively connecting said belts for synchronous movement with one another at right angles to said conveyor; and means for driving said conveyor.

7. An artificial movable landscape comprising, in combination, a plurality of endless belts; landscape elements on said belts; an endless conveyor; means for supporting said belts on said conveyor in edge to edge relationship to form a substantially continuous surface, and for movement at right angles with respect to the direction of movement of the conveyor; means for driving said belts in synchronism with one another; means for driving said conveyor; means for viewing said surface in a predetermined azimuth direction; and means for controlling both said driving means in accordance with the azimuthal adjustment of said viewing means.

8. An artificial movable landscape comprising, in combination, a plurality of endless belts; landscape elements on said belts; an endless conveyor; means for supporting said belts on said conveyor in edge to edge relationship to form a substantially continuous surface, and for movement at right angles with respect to the direction of movement of the conveyor; means for driving said belts in synchronism with one another; means for driving said conveyor; means for viewing said surface; and means for increasing and decreasing the apparent visual distance between said viewing device and said surface.

9. An artificial movable landscape comprising, in combination, a plurality of endless belts; landscape elements on said belts; an endless conveyor; means for supporting said belts on said conveyor in edge to edge relationship to form a substantially continuous surface, and for movement at right angles with respect to the direction of movement of the conveyor; means for driving said belts in synchronism with one another; means for driving said conveyor; means for viewing said surface in a predetermined azimuth direction; means for controlling both said driving means in accordance with the azimuthal adjustment of said viewing means; and means for increasing and decreasing the apparent visual distance between said viewing device and said surface.

10. An artificial movable landscape comprising, in combination, a plurality of endless belts; landscape elements on said belts; an endless conveyor; means for supporting said belts on said conveyor in edge to edge relationship to form a substantially continuous landscape surface and for movement at right angles to the direction of movement of the conveyor; means for viewing said belts in a predetermined azimuth direction; a horizon member surrounding said belts and forming a visual horizon for said landscape surface; means for driving said belts; and means for driving said conveyor.

11. A device of the character described, comprising, in combination, a first set of sprocket wheels consisting of two coaxially arranged wheels; a common drive shaft for said first set of wheels; a second set of sprocket wheels consisting of two coaxially arranged wheels in line with the wheels of said first set; a shaft for said second set of wheels; two sprocket conveyor chains trained around aligned wheels of said first and second set respectively; a third set of sprocket wheels consisting of two aligned wheels mounted coaxially with, but independent from, the wheels of said first and second set respectively; a drive chain trained around said third set of wheels; a plurality of belt assemblies mounted on said conveyor chains, each belt assembly comprising a frame member, end pulleys on said member, an endless belt trained around said end pulleys, and drive means for said belt, said drive means engaging said drive chain, said belt assemblies being mounted in edge to edge relation of the belts so as to form a substantially continuous surface adapted to be moved at right angles with respect to the conveyor chains; power means for driving said common drive shaft; power means for driving said drive chain; and means for controlling rate and direction of said drive means whereby a point on said surface may be moved in any direction at any desired rate.

12. A device of the character described, comprising, in combination, a first set of sprocket wheels consisting of two coaxially arranged wheels; a common drive shaft for said first set of wheels; a second set of sprocket wheels consisting of two coaxially arranged wheels in line with the wheels of said first set; a shaft for said second set of wheels; two sprocket conveyor chains trained around aligned wheels of said first and second set respectively; an endless track adjacent to and parallel with said conveyor chains; a third set of sprocket wheels consisting of two aligned wheels mounted coaxially with, but independent from, the wheels of said first and second set respectively; a drive chain trained around said third set of wheels; a plurality of belt assemblies, each belt assembly comprising, a frame member, end pulleys on said frame members, an endless belt trained around said end pulleys, and drive means for said belt, said drive means engaging said drive chain; supporting brackets secured to links of said conveyor chains and to said frame member respectively, said supporting brackets engaging said tracks, said belt assemblies being mounted in edge to edge relation of the belts so as to form a substantially continuous surface adapted to be moved at right angles with respect to said conveyor chains.

13. Apparatus for realistically simulating the visual sensation of flight over a terrain and comprising an artificial landscape movable in all directions in a field of operation and including an endless supporting conveyor, a plurality of endless belts in edge-to-edge relation operable transversely of said endless conveyor, carrying landscape delineating elements collectively illustrating features of a particular terrain, means supporting said endless belts in said transversely operable relation on said conveyor and arranged to carry said belts about the ends of the conveyor out of and back into the range of vision of an observer at a point for observation of the landscape and controllable means for driving said conveyor and for independently driving the the belts carried by the conveyor to create the illusion of both transverse and longitudinal movements and various components of the same.

14. Apparatus for realistically simulating the visual sensation of flight over a terrain and comprising an artificial landscape movable in all directions in a field of operation and including an endless supporting conveyor, a plurality of endless belts in edge-to-edge relation operable transversely of said endless conveyor, carrying landscape delineating elements collectively illustrating features of a particular terrain, means supporting said endless belts in said transversely operable relation on said conveyor and arranged to carry said belts about the ends of the conveyor out of and back into the range of vision of an observer at a point for observation of the landscape, controllable means for driving said conveyor and for independently driving the belts carried by the conveyor to create the illusion of both transverse and longitudinal movements and various components of the same, and means at said point of observation for effecting visual changes of the observer in various angular relations in respect to said variously traveling artificial landscape forming belts.

CLIFTON M. JONES.